Nov. 26, 1929. G. M. BACON 1,737,489
CONTROL MECHANISM FOR MOTOR VEHICLES
Original Filed Nov. 21, 1927 2 Sheets-Sheet 2
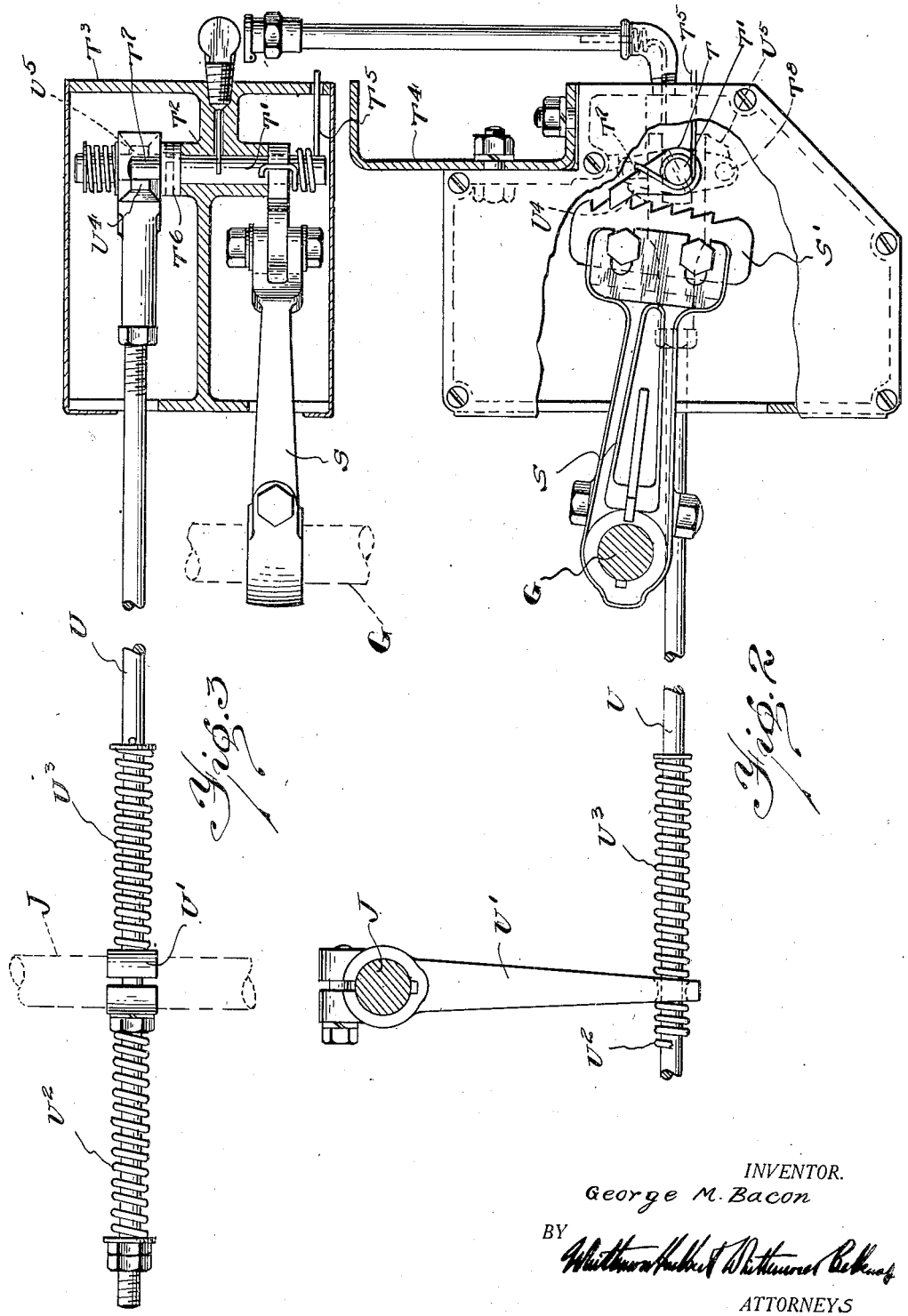
INVENTOR.
George M. Bacon
BY
ATTORNEYS Patented Nov. 26, 1929

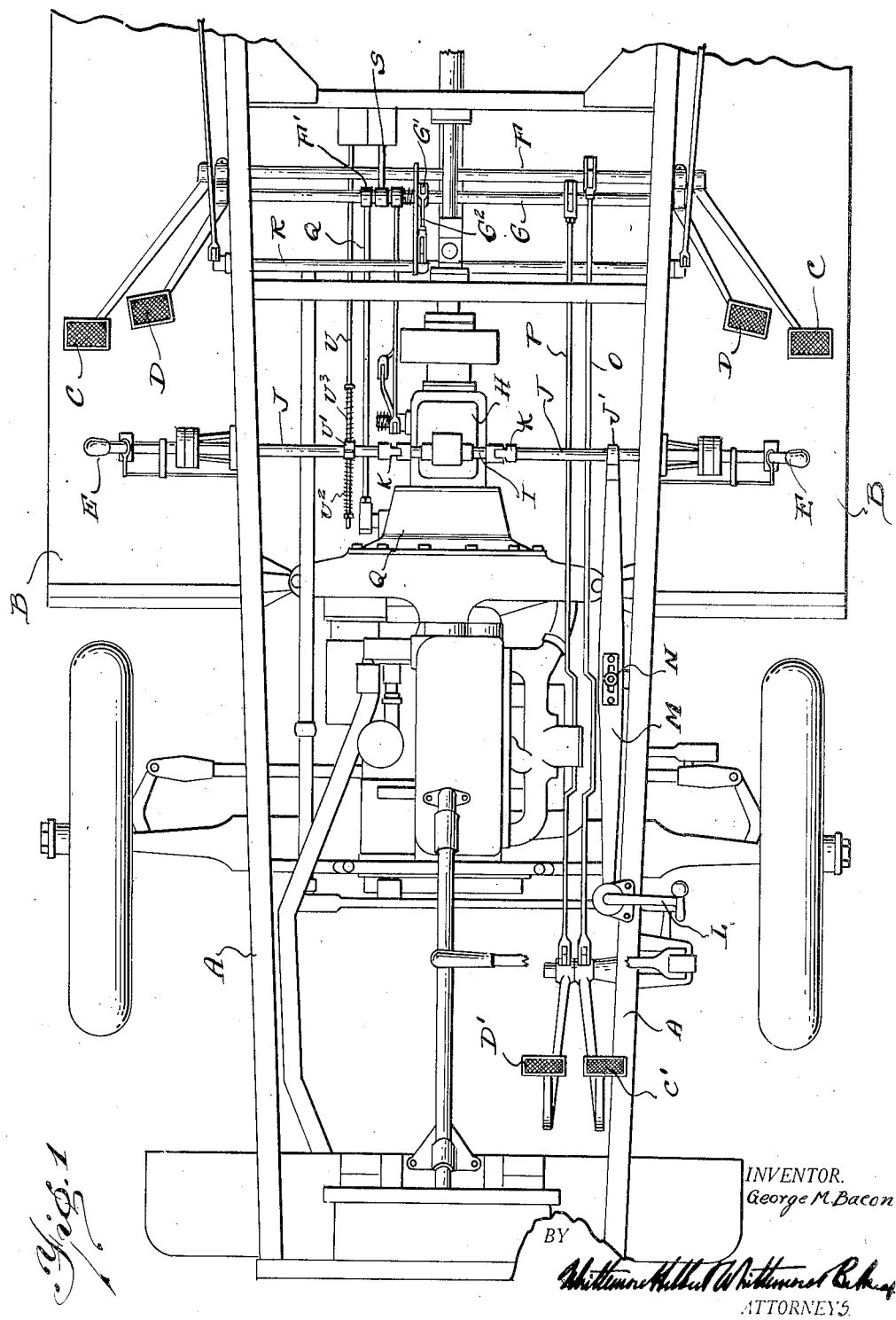

1,737,489

UNITED STATES PATENT OFFICE

GEORGE M. BACON, OF DETROIT, MICHIGAN, ASSIGNOR TO DIVCO-DETROIT CORPORATION, OF DETROIT, MICHIGAN, A CORPORATION OF MICHIGAN

CONTROL MECHANISM FOR MOTOR VEHICLES

Application filed November 21, 1927, Serial No. 234,766. Renewed April 13, 1929.

My invention relates to control mechanism for motor vehicles more particularly designed for use on vehicles of that type where the controls are exposed outside the body. For instance certain motor vehicles used as delivery cars are provided with controls located on the running boards as auxiliary to the controls adjacent to the driver's seat. This enables the delivery man to shift the car from house to house without the necessity of mounting to the seat. With such exposed controls there is always danger of someone tampering with them as for instance releasing the brake when the vehicle is parked on a grade. I have therefore devised a construction which permits of easily applying and locking the brake but which requires the manipulation of another control member before the brake can be released. The invention therefore consists in this and other novel features of the construction as hereinafter set forth.

In the drawings:

Figure 1 is a diagrammatic plan view of a vehicle to which my improved control mechanism is applied.

Figure 2 is an enlarged side elevation of the brake setting and releasing mechanism.

Figure 3 is a plan view thereof.

As specifically shown A is the chassis of a motor vehicle having at its opposite sides the running boards B and operable from these running boards control mechanism including a brake pedal D, clutch pedal C and gear shift operating lever E. The clutch pedals C are secured to opposite ends of a shaft F extending across the chassis frame and in like manner the brake pedals D are mounted at opposite ends of a rock shaft G. The shifting of the gears in the transmission housing H is effected through the medium of a rockably and longitudinally slidable shaft I which is connected to the levers E through the medium of links J having universal coupling connections K with said shaft. The arrangement is such that the shifter is moved out of neutral position by a longitudinal sliding of the shaft I in one direction or the other while the shifting of the gears is accomplished by the rocking of the shaft both of these movements being accomplished by proper manipulation of either of the levers E. A third point of control for the shifter is on the forward part of the chassis frame in convenient proximity to the driver's seat (not shown), this control consisting of a universally pivoted lever L connected at its lower end with a link lever M longitudinally slidable and rockable upon a fulcrum bearing N and having its opposite end connected to a rock arm J' on one of the links J.

The rock shafts F and G are also operable from forward pedals C', D' which are coupled to said shaft through the medium of link rods O, P. The rock shaft F is connected through the medium of a rock arm F' and rod Q with the clutch located in the clutch housing Q'. The rock shaft G is connected through a rock arm G' and link G² with an equalizing rock shaft R which actuates the brakes (not shown).

For holding the vehicle from movement when it is parked the brake pedals D, D' when applied are locked. This might be accomplished by any suitable construction of ratchet lock together with releasing means therefor but to avoid accidental release I have devised the following construction; the rock shaft G has mounted thereon the rock arm S which at its free end carries the segmental ratchet bar S' for engaging a spring locking dog T. The latter is mounted on a rock shaft T' journaled in a bearing T² which is within the housing T³ secured to and depending from the frame cross bar T⁴. The torsion spring T⁵ sleeved on the shaft T' normally yieldably presses the dog toward a position for engaging the ratchet. At the opposite end of the shaft T' there is arranged a double lever T⁶ having laterally projecting pins T⁷ and T⁸ respectively at the upper and lower end thereof. U is a rod slotted at one end to slidably engage the shaft T' while its opposite end passes through an eye in a rock arm U' connected to one of the links J. Sleeved upon the rod U and arranged upon opposite sides of this rock arm are the springs U² and U³ having abutments on said rod U and in normal position of parts counterbalancing each other. The slotted end of the rod U has projecting therefrom the oppositively facing lugs or shoulders U⁴ and U⁵ for engaging respectively the pins T⁷ and T⁸.

With the construction just described whenever the brake pedal D is depressed the rocking of the shaft G and the rock arm S thereon will raise the ratchet bar S′ while the dog T successively engages the teeth of said ratchet to lock the parts from return movement. This will hold the brake in said position and it will be impossible to release it by any manipulation of the pedal D alone. Before setting the brake it is usual to throw the transmission into neutral position and in such neutral position the rockable link J is in the position shown in Figure 2 with the rock arm U′ centrally between the springs U² and U³ on the rod U. Before desiring to release the brake the operator usually starts his engine or if the engine is running releases the clutch and shifts the transmission into low gear. Such shifting of the transmission necessitates the rocking of the shaft I and links J and through the latter the rocking of the arm U′ which will compress one or the other of the springs U² and U³. The tension of the compressed spring urges the rod U in the same direction which will transmit a torque to the shaft T′ through one or the other of the lugs T, U⁴, U⁵ and pins T⁷ and T⁸. For instance, if the arm U′ is rocked toward the left in Figure 2 this will compress the spring U² which will draw upon the rod U causing the lug U⁵ to press on the pin T⁸ thereby tending to rock the double lever T⁶ in a clockwise direction which in turn tends to rock the dog T out of engagement with the ratchet bar. Such rocking is however temporarily prevented due to the fact that the ratchet teeth are under cut in their relation to the dog and cannot be released without first slightly raising the ratchet bar. On the other hand if the rock arm U′ is rocked toward the right it will compress the spring U³ placing the pressure upon the rod U and through the lug U⁴ engaging the pin T⁷ tending to rock the double lever T⁶ in the same clockwise direction. Thus whichever way the arm U′ is rocked the same force is transmitted to the rock shaft T′ tending to release the dog T. However, to complete the release the operator must press upon the pedal D which, by slightly raising the ratchet bar S′ permits the disengagement of the dog whereupon the tension of the spring U² or U³ will move the dog out of engagement position.

While I have described the releasing mechanism for the brake as actuated through the gear shift lever it is obvious that it might be actuated by any other control member usually independent of the brake. However, the gear shift is particularly adapted for this purpose due to the fact that it is seldom desired to leave the engine in gear when the brakes are applied. Moreover with delivery cars it is often desirable to leave the engine running which necessitates the shifting of the gears to neutral before the brakes are locked.

What I claim as my invention is:

1. In a vehicle control mechanism the combination of a control element and locking means therefor, of releasing means for said locking means requiring for its operation the manipulation of another control.

2. In a vehicle control mechanism the combination of a control element, automatic locking means therefor incapable of direct release, a second control element and releasing means for said locking means operable upon the manipulation of said second control element.

3. In a vehicle control mechanism the combination of a brake and means for locking the same in braking position incapable of direct release, a second control element and means for releasing said locking means operable upon the manipulation of said second control element for releasing said brake.

4. In a vehicle control mechanism the combination of a brake and a locking mechanism therefor, incapable of direct release, of a transmission control element and means operable upon the manipulation of said transmission control for releasing said brake.

5. In a vehicle control mechanism the combination of a brake and a ratchet locking mechanism therefor incapable of direct release, a transmission control element and means operable upon the manipulation of said elements for releasing said brake.

6. In a vehicle control mechanism, the combination of a brake, a ratchet locking mechanism therefor incapable of direct release, a rockable gear shift element and means operable by the rocking of said element in either direction for releasing said lock.

7. In a vehicle control mechanism, the combination of a brake, locking mechanism therefor including a ratchet bar and a dog for engaging the same, a rockable gear shifting element and a connection between said rockable element and said dog for placing a releasing tension on the latter upon the rocking of said element in either direction.

8. In a vehicle control mechanism, the combination of a brake and a locking mechanism therefor including a ratchet bar and a dog for engaging the same, a rockable gear shifting element, a rod engageable with said dog to actuate the same toward releasing position upon the movement of said rod in either direction and opposed yieldable connections between said rocking element and said rod balanced in the normal position of said element and respectively tensioned by the rocking of said element in reverse directions.

9. In a vehicle control mechanism, the combination of a control element and a locking mechanism therefor including a ratchet bar and a dog for engaging the same, a second control element and releasing means for said locking mechanism operable upon the manipulation of said second control element to urge the dog toward unlocking position with insufficient force to actually unlock the same without the operation of said first mentioned control element.

10. In a vehicle control mechanism, the combination of a brake and a locking mechanism therefor including a ratchet bar and a dog for engaging the same, a rockable gear shifting element and a connection between said element and said dog operable upon manipulation of said element for placing a releasing tension upon the dog insufficient to actually move the latter to unlocked position without operation of another control element.

11. In a vehicle control mechanism, the combination of two control elements and a locking mechanism for one of said elements, a releasing means for the locking mechanism operable only when the two control elements are in certain predetermined relative positions, whereby the operation of either of said control elements while the other is not in the said predetermined position is ineffective to release the locking mechanism.

12. In a vehicle control mechanism, the combination with a brake and a control element therefor, of locking mechanism for locking said brake in applied position, a transmission control element, a releasing means for the locking mechanism operable only when the two controls are in certain predetermined relative positions, whereby the operation of either of said controls while the other is not in the said predetermined position is insufficient to release the brake.

13. In a vehicle control mechanism the combination of two control elements, locking mechanism for one of said elements and releasing means for said locking mechanism requiring for its operation the manipulation of both control elements.

14. In a vehicle control mechanism, the combination of a brake, locking mechanism therefor including a ratchet and a dog for engaging the same, a movable control element and a member normally engageable with said dog and operable by said control element to exert a force upon said dog tending to release the same from said ratchet.

15. In a vehicle control mechanism, the combination of a control element and locking mechanism therefor including, a ratchet operable by said control element, a dog engageable with said ratchet, a second control element, means operable upon the manipulation of said second control element for urging the dog toward unlocked position, and means associated with the ratchet for preventing operation of the means aforesaid until further actuation of the ratchet by said first mentioned control element.

16. In a vehicle control mechanism, the combination of a pair of control elements and locking mechanism for one of the control elements including a ratchet operatively connected to one of said elements and a dog engageable with said ratchet and operatively connected to the other of said control elements, means operable upon manipulation of said last mentioned control element to exert a force upon the dog tending to move the latter out of engagement with the ratchet, and means associated with the ratchet for maintaining the dog in engagement therewith until further operation of the control element to which said ratchet is operatively connected.

In testimony whereof I affix my signature.

GEORGE M. BACON.